United States Patent
Maxwell et al.

(10) Patent No.: US 11,379,545 B2
(45) Date of Patent: Jul. 5, 2022

(54) PAIRING SYSTEMS AND METHODS FOR ELECTRONIC COMMUNICATIONS

(71) Applicant: Verizion Patent and Licensing Inc., Basking Ridge, NJ (US)

(72) Inventors: Lachlan Ahren Maxwell, Ashburn, VA (US); Donald Jeffrey McQueen, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 235 days.

(21) Appl. No.: 16/229,366

(22) Filed: Dec. 21, 2018

(65) Prior Publication Data

US 2019/0121830 A1    Apr. 25, 2019

Related U.S. Application Data

(63) Continuation of application No. 14/963,164, filed on Dec. 8, 2015, now Pat. No. 10,198,517.

(60) Provisional application No. 62/089,038, filed on Dec. 8, 2014.

(51) Int. Cl.
*G06F 16/9535* (2019.01)
*H04L 51/04* (2022.01)
*H04W 4/21* (2018.01)
*H04L 51/52* (2022.01)

(52) U.S. Cl.
CPC .......... *G06F 16/9535* (2019.01); *H04L 51/04* (2013.01); *H04L 51/32* (2013.01); *H04W 4/21* (2018.02)

(58) Field of Classification Search
CPC .......... G06F 16/9535; G06F 16/24578; G06F 16/951; G06F 16/435; G06F 16/3346
See application file for complete search history.

(56) References Cited

U.S. PATENT DOCUMENTS

| | | | | |
|---|---|---|---|---|
| 6,389,372 B1 * | 5/2002 | Glance | ................... | G06Q 30/02 702/189 |
| 8,595,146 B1 * | 11/2013 | Liew | ..................... | H04L 65/403 705/319 |
| 8,874,559 B1 * | 10/2014 | Karimzadehgan | ........................... | G06F 16/24568 707/723 |
| 9,047,628 B2 * | 6/2015 | Mislove | ............. | G06Q 30/0282 |

(Continued)

FOREIGN PATENT DOCUMENTS

CN         102779131        * 11/2012

OTHER PUBLICATIONS

Alba et al., "Applications of Voting Theory to Information Mashups". IEEE, 2008.*

(Continued)

*Primary Examiner* — Daniel A Kuddus

(57) ABSTRACT

Systems, methods, and computer-readable media are provided for pairing users for electronic communications over a network. In accordance with one implementation, a method is provided for pairing users that request a chat encounter or other form of electronic communication. The operations of the method include receiving a request from a first user and calculating a plurality of pairing scores, each pairing score based on a collaborative filtering score. The method further includes selecting a second user based on the plurality of pairing scores and pairing the first user with the second user to enable electronic communications.

16 Claims, 8 Drawing Sheets

501 – User1
502 – User2
503 – User3
504 – Sports Club

(56) References Cited

U.S. PATENT DOCUMENTS

| | | | | |
|---|---|---|---|---|
| 9,098,819 | B1* | 8/2015 | Korula | G06Q 10/06 |
| 9,135,573 | B1* | 9/2015 | Rodriguez | G06N 20/00 |
| 2005/0074241 | A1* | 4/2005 | Farmer | H04Q 11/0067 |
| | | | | 398/72 |
| 2005/0198131 | A1* | 9/2005 | Appelman | H04L 51/04 |
| | | | | 709/204 |
| 2005/0216300 | A1* | 9/2005 | Appelman | G06Q 10/10 |
| | | | | 705/26.1 |
| 2013/0159100 | A1* | 6/2013 | Raina | G06Q 50/01 |
| | | | | 705/14.52 |
| 2013/0343597 | A1* | 12/2013 | Kocks | G06F 16/7867 |
| | | | | 382/100 |
| 2013/0343598 | A1* | 12/2013 | Kocks | H04N 21/25 |
| | | | | 382/218 |
| 2014/0149513 | A1* | 5/2014 | Grennan | G06Q 30/0631 |
| | | | | 709/204 |
| 2014/0222806 | A1* | 8/2014 | Carbonell | G06F 16/90335 |
| | | | | 707/732 |
| 2017/0206281 | A1* | 7/2017 | Palmert | G06F 16/9535 |

OTHER PUBLICATIONS

Gupta et al., "Personalization of Web Search Results Based on User Profiling". IEEE, 2008.*

Gupta et al., "Personalization of Web Search Results Based on User Profiling". IEEE, 2008 (Year: 2008).*

* cited by examiner

600

| USER | 1 | 2 | 3 | 4 | 5 |
|---|---|---|---|---|---|
| 1 | N/A | 4 | ? | ? | ? |
| 2 | 5 | N/A | 4 | ? | ? |
| 3 | ? | 5 | N/A | ? | ? |
| 4 | ? | ? | ? | N/A | 1 |
| 5 | ? | 3 | ? | 2 | N/A | ratee ←
601 → ?
rater ↑

FIG. 6

PAIRING SYSTEMS AND METHODS FOR ELECTRONIC COMMUNICATIONS

CROSS-REFERENCE TO RELATED APPLICATION(S)

This application is a continuation of and claims the benefit of priority under 35 U.S.C. § 119 to U.S. Nonprovisional application Ser. No. 14/963,164 filed Dec. 8, 2015, which claims the benefit of priority to U.S. Provisional Application No. 62/089,038, filed Dec. 8, 2014, all of which are incorporated herein by reference in their entireties.

TECHNICAL FIELD

The present disclosure relates generally to the fields of data processing and electronic communications. More particularly, and without limitation, the present disclosure relates to computerized systems and methods for pairing users for electronic communications.

BACKGROUND

Various systems allow users to electronically communicate with each other through a network, such as the Internet. For example, chat and messaging systems allow users to communicate with people they know, such as friends, family, and colleagues. These systems, however, often lack the ability to connect users with strangers. As a result, these systems generally limit a user's scope of communication partners to known individuals or referrals from those known individuals.

Some systems attempt to connect users, but generally do so for a specific purpose, such as dating or developing a relationship. These applications and systems typically require a large amount of personal data, often collected through a registration form and/or answers to survey questions, in order to function effectively. From the perspective of users, these systems are onerous and unattractive because of the substantial amount of time needed to enter personal information and preferences. As a result, these systems are not suitable for casual chat or messaging encounters.

Collected personal data may be used to estimate preferences of users and propose introductions of users with shared interests. For instance, users may be introduced to one another based on shared interests, occupations, and/or geography. Such approaches, however, suffer from one or more drawbacks, including inaccurate estimates of user preferences and/or the inability to adapt to changing user preferences. Other drawbacks include, for example, high levels of data collection and maintenance.

SUMMARY

In accordance with embodiments of the present disclosure, computer implemented systems, methods and computer-readable media are provided for pairing users for electronic communications, including chat and instant messaging. As disclosed herein, the pairing of users may be based on pairing scores and/or other data.

In accordance with an embodiment, a computer-implemented method is provided for pairing users for electronic communications over a network. The method may comprise receiving a request from a first user and calculating a plurality of pairing scores. Each of the plurality of pairing scores may be based on a collaborative filtering score between the first user and one of a plurality of users. Each of the plurality of pairing scores may further be based on a distance score between the first user and the one of a plurality of users. The method may further comprise selecting a second user from the plurality of users based on the plurality of pairing scores and pairing the first user with the second user to enable electronic communications.

In accordance with another embodiment, a computer-implemented system is provided for pairing users for electronic communications over a network. The system may comprise a storage device that stores instructions and at least one processor that executes the instructions. The at least one processor may be configured with the instructions to receive a request from a first user and calculate a plurality of pairing scores between the first user and a plurality of other users. Each of the plurality of pairing scores may be based on a collaborative filtering score between the first user and one of the plurality of other users. Each of the plurality of pairing scores may further be based on a distance score between the first user and the one of a plurality of users. The at least one processor may be further configured by the instructions to cause the at least one processor to select a second user from the plurality of other users based on the plurality of pairing scores and pair the second user with the first user to enable electronic communications. Computer-readable, non-transitory media implementing the above method are also disclosed. The computer-readable media may store instructions that configure at least one processor to receive a request from a first user and calculate a plurality of pairing scores between the first user and a plurality of other users. Each of the plurality of pairing scores may be based on a collaborative filtering score between the first user and one of the plurality of other users. Each of the plurality of pairing scores may further be based on a distance score between the first user and the one of a plurality of users. The at least one processor may be further configured by the instructions to select a second user from the plurality of other users based on the plurality of pairing scores and pair the second user with the first user to enable electronic communications.

In accordance with another embodiment, a computer-implemented method is provided for filtering unwanted electronic communications. The method may comprise receiving a request from a first user to communicate with a second user and calculating a pairing score between the first user and the second user. The pairing score may be based on a collaborative filtering score between the first user and the second user. The method may further comprise determining whether to allow the first user to communicate with the second user based on the pairing score.

Additional embodiments and related features of the present disclosure are presented herein.

BRIEF DESCRIPTION OF DRAWINGS

The accompanying drawings, which are incorporated in and constitute a part of this disclosure, illustrate several embodiments and aspects of the present disclosure, and together with the description, serve to explain certain principles of the presently disclosed embodiments.

FIG. 6 illustrates an exemplary problem solved by collaborative filtering, consistent with embodiments of the present disclosure.

DETAILED DESCRIPTION

Figure 1:
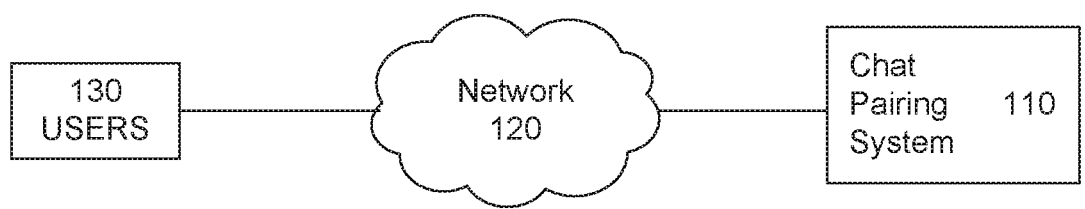
FIG. 1 illustrates an exemplary system environment for implementing embodiments of the present disclosure.

Embodiments of the present disclosure will now be described with reference to the examples and the accompanying figures. The embodiments of FIGS. 1-7 are provided for purposes of illustration, and not limitation, and may be implemented together or individually.

Embodiments of the present disclosure encompass systems, methods, and computer-readable media for pairing users for electronic communications, such as chat or instant messaging. By way of example, user pairing may occur in the context of chat programs or applications in a social network or service. User pairing may also occur in other contexts. Pairing may result in placing users into groups of two or more for a purpose. Pairing may, for example, place users into groups of two or more users for the purpose of initiating a chat encounter between the users. Pairing may also include, for instance, determining whether users that were previously engaged in electronic communications should be paired, for the purpose of blocking a request or filtering objectionable or otherwise unwanted content. User pairing may also occur across platforms and applications. For example, pairing may result in a chat encounter between users of the same program or in an encounter between users of different applications, such as between a chat program and an application for accessing social media. In accordance with certain embodiments, the pairing of users may be for the purpose of a casual encounter, such as a brief chat. In accordance with other embodiments, pairing of users may further a more substantial goal, such as a friendship, a relationship, or a job interview.

Embodiments of the present disclosure also encompass systems, methods, and computer-readable media for users that have already engaged or are in the process of engaging in electronic communications, such as chat, instant messaging, or email. For example, user pairing may occur for users currently involved in a chat session or as a result of an email message. In accordance with certain embodiments, the pairing of users may be for the purpose of filtering, such as spam filtering. For instance, in some embodiments, analysis of users that have already engaged in electronic communications may occur to determine whether the electronic communications are preferred, likely, or of high quality by determining whether the system would have paired the users for the purpose of electronic communications had the users not initiated direct electronic communications on their own.

Embodiments of the present disclosure encompass systems, methods, and computer-readable media for pairing users. In some embodiments, users are paired for the purpose of a chat encounter or other electronic communication. A chat encounter may include electronic communications. The electronic communications may be one-way or bidirectional. In some embodiments, a chat encounter may include text based communications. In some embodiments, a chat encounter may include other forms of electronic communications, such as voice or audio, as well as images or video. For example, a chat encounter may include text based communications and may optionally include the use of emoticons, embedded images, embedded video, and/or audio recordings.

FIG. 1 illustrates an exemplary system environment 100, consistent with embodiments of the present disclosure. While the exemplary embodiment of FIG. 1 and the other embodiments herein are described with reference to chat-based communications, it will be appreciated from this disclosure that the embodiments may be implemented with other forms of electronic communication (e.g., text messaging; instant messaging; etc.). Moreover, while an exemplary arrangement and number of components is shown in FIG. 1, it will be appreciated from this disclosure that other arrangements and numbers of components are possible, including system environments where the number and arrangement of components differs (i.e., increased, decreased, and/or modified) from that illustrated in FIG. 1.

As shown in FIG. 1, system environment 100 includes chat pairing system 110, a network 120, and a plurality of users 130. Chat pairing system 110 interacts with users 130 through network 120. In some embodiments, chat pairing system 110 may include components of the system described further below in reference to FIG. 2. Users 130 may include one or more users that interact with chat pairing system 110. For example, users 130 may include a plurality of users seeking a chat encounter and interacting with chat pairing system 110. Users 130 may send chat requests to chat pairing system 110 through network 120. As a result, chat pairing system 110 may pair users and initiate chat encounters between user pairs.

Chat pairing system 110 may receive chat requests. A request may include any combination of data, a message, or a signal that indicates that a user is seeking a chat encounter. For example, chat pairing system 110 may receive a predefined message, in the form of a data packet that indicates a user is requesting a chat encounter.

Chat pairing system 110 may receive chat requests through network 120. Network 120 may comprise one or more networks suitable for electronic communication such as, for example, the Internet, an intranet, and/or a local LAN. For example, network 120 may include one or more local networks and the Internet. In some embodiments, network 120 also includes virtual networks. For example, in an embodiment, users may connect to network 120 and send virtual requests to chat pairing system 110 that never leave the mainframe or that are routed via a virtual private network to chat pairing system 110.

Users 130 may operate devices to send requests to chat pairing system 110 through network 120. Examples of devices operated by users 130 include personal computers, laptops, smartphones, mobile devices, PDAs, tablets, or other computing devices (e.g., smart televisions, smart watches, etc.). In some embodiments, one or more devices operate and include chat applications. For example, one or more of the devices may operate a chat application with features similar to that in the exemplary embodiment of FIG. 4 and further described below. In some embodiments, the devices of users 130 may operate other applications that include the functionality of a chat application. For instance, some devices may operate a social networking application that includes the functionality of a chat application. Devices may operate the same chat application or different applications altogether. It will be appreciated that a number of different chat applications may interact simultaneously with a given chat pairing system and engage in cross-application chat encounters.

Chat pairing system 110 may receive chat requests through network 120 and generate paring scores between each of the requesting users. A pairing score may comprise a number or other indicator describing the desirability of a particular pairing. For example, a pairing score may be a number between 1 and 100, with 100 indicating a highly desirable pairing and 1 indicating an undesirable pairing. Embodiments for generating pairing scores are further described below.

Based on these pairing scores, chat pairing system 110 may pair users and initiate chat encounters between the paired users. For example, chat pairing system 110 may pair users based on a desirable pairing score between them. As a result, chat pairing system 110, may send data to each of the users through network 120 sufficient to allow the user devices to initiate a chat encounter. In some embodiments, the data may include user data, an IP address, a unique user-id, or other data sufficient to identify the paired devices and/or chat applications. For example, chat pairing system 110 may send the network IP address of the devices corresponding to the paired users to enable the devices to communicate with each other. In some embodiments, the data may include other information, such as data relating to the capabilities of the chat application used by a device. For instance, chat pairing system may transmit data to one device to indicate that another device does not have video capabilities.

Chat pairing system 110 may pair users for purposes other than initiating a chat encounter. In some embodiments, chat pairing system 110 may pair users for other forms of electronic communications. For example, chat pairing system 110 may pair users for engaging in a gaming encounter, such as a virtual battle, or online game. In some embodiments, chat pairing system 110 may pair users for non-instantaneous electronic communications. For example, in an embodiment, chat pairing system 110 may pair users in the context of an online message board or comment board. In such embodiments, chat pairing system 110 may pair each user with a certain number of other users and only display messages or comments from paired users. Chat pairing system 110 may, for example, automatically hide messages from unpaired users in such an embodiment, thereby enriching each user's experience by only displaying comments from users with high associated pairing scores.

In still other embodiments, chat pairing system 110 may pair users for the purpose of filtering electronic communications. For example, in an embodiment, chat pairing system 110 may pair users that have already engaged in electronic communications, such as chat or email, and filter out electronic communications based on one or more criteria. Chat pairing system 110 may filter electronic communications between users that have already engaged in communications, are engaging in electronic communications, or are seeking to engage in communications with identified other users by determining whether the system would have paired those users for communications in the first place. For instance, chat pairing system 110 pair each user with a certain number of other users and only display electronic communications from paired users. In another example, chat pairing system 110 may pair all users with a pairing score above a certain threshold, enable electronic communications between paired users, and filter out remaining communications. In such cases, chat pairing system 110 may receive a chat request whenever users engage in electronic communications. As noted above, other forms of electronic communications may be implemented, consistent with the present disclosure. Accordingly, references to "chat" or "chat encounter" in this disclosure is made by way of example only.

Figure 2:
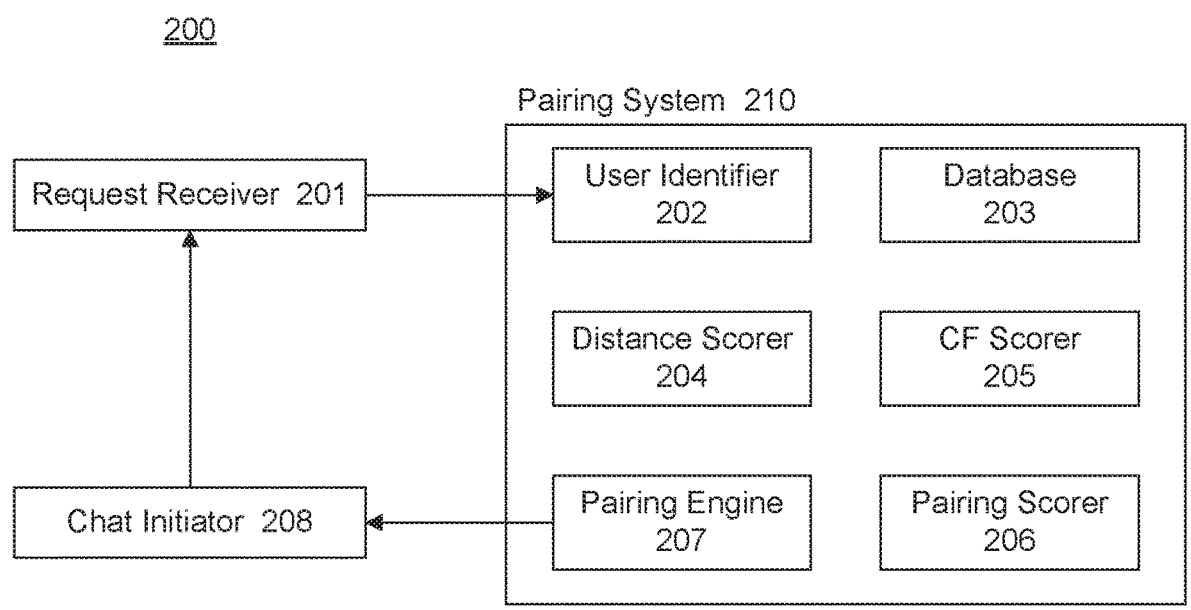
FIG. 2 illustrates an exemplary system for implementing embodiments of the present disclosure.

FIG. 2 illustrates an exemplary system 200 for implementing embodiments of the present disclosure. As shown in FIG. 2, system 200 includes a request receiver 201, a pairing system 210, and a chat initiator 208. Pairing system 210 includes a user identifier 202, a database 203, a distance scorer 204, a collaborative filtering (CF) scorer 205, a pairing scorer 206, and a pairing engine 207. These components of system 200 may be implemented using any suitable combination of hardware, software, and/or firmware. In some embodiments, the components correspond to functional blocks that are implemented with a set of instructions executed by suitable hardware (e.g., a computer, a server, a group of computers, or one or more computing nodes or clusters operating over a network). In some embodiments, the components correspond to individual servers and/or other discrete hardware components that cooperate together to perform the functions of system 200. For example, the functional blocks may comprise a number of computing clusters running the Apache Spark framework operating over the Internet or an intranet. The number and arrangement of components in FIG. 2 is merely provided for illustration. It will be appreciated that other arrangements and quantity of components may be provided to implement the system. For example, in some embodiments, the system 200 may integrate or combine one or more components, such as the request receiver 201 and chat initiator 208 into pairing system 210.

In some embodiments, request receiver 201 receives request data, such as a request for a chat encounter (chat request) initiated by a user. The request data may be explicit. For instance, in an embodiment, the request receiver 201 may receive request data indicating that a user currently desires a chat encounter. The request may also be implicit. For example, in an embodiment, request receiver 201 may receive request data indicating that a user is available on a network and has previously opted into engaging in chat encounters. In some embodiments, request receiver 201 may only receive data indicating that a user device is connected to a network. For example, the system 200 may determine, upon a user connecting, that the user has previously opted into engaging in chat encounters based on data stored in database 203. Based on this determination, request receiver 201 may then interpret received data indicating a user device has connected as a chat request.

Request receiver 201 may receive request data from any source. In some embodiments, request receiver 201 may receive request data from personal computers, laptops, servers, handheld devices, or other computing devices (e.g., smart televisions, smart watches, etc.). Request receiver 201 may receive request data manually or automatically. For example, a user may transmit request data to the request receiver by providing input via a keyboard, mouse, or touchscreen. In another example, a device and/or server may automatically transmit request data to the request receiver after determining that a user has logged on and/or previously opted into engaging in chat encounters. The device or server, may, for example, transmit such request data only under certain conditions, such as when it determines the user is presently using a device or application.

Request receiver 201 may receive request data through a variety of protocols. For example, request receiver 201 may receive requests through standard Internet protocols, such as HTTP, TCP, UDP, and/or other protocols. In some embodiments, request receiver 201 may receive request data through Remote Procedure Calls (RPC) or any other suitable standard for receiving data. In some embodiments, request receiver 201 may receive request data individually, such as from an individual user. In some embodiments, request receiver 201 may receive request data in bulk, such as through a batch transfer from an intermediate server. In other embodiments, request receiver 201 may receive some data individually and some data in bulk.

Request receiver 201 may transmit the request data to user identifier 202. In some embodiments, request receiver 201 may transmit a message to user identifier 202 indicating the presence of request data stored in a predefined location. For example, request receiver 201 may transmit a signal indicating the presence of request data at the predefined location to user identifier 202 and user identifier 202 may then retrieve the request data. Request receiver 201 may transmit request data to user identifier 202 individually, in bulk, or in some combination of the two. In an embodiment, request receiver 201 may transmit request data to user identifier 202 on a predefined schedule, such as every 5 or 10 seconds. In an embodiment, request receiver 201 may await a message from user identifier 202, indicating that the user identifier 202 is ready to receive request data, before transmitting.

In some embodiments, user identifier 202 receives and processes the request data into user data. For example, user identifier 202 may, using the request data, determine or identify user data including a unique user-id and request duration for each of the chat requests. User identifier 202 may determine a request type, such the desired chat type (e.g., voice, text, video, etc.). In some embodiments, determining the request type may include determining the text, video, and/or voice capabilities of the particular user's device or application.

User identifier 202 may determine whether the database 203 contains associated user data pertaining to the chat request. In some embodiments, user identifier 202 may do this based on a unique user-id, login information, IP address, or other identifying information. User identifier 202 may extract associated user data within database 203. In some embodiments, the associated user data includes one or more of a user name, real name, location, age, interests, preferences, occupation, and/or any other data pertaining to a user. In some embodiments, the associated user data includes a device type, application type, application capabilities, network type, and/or any other data pertaining to a user device.

User identifier 202 may update the database. In some embodiments, user identifier 202 may update database 203 with a request type, user name, device capability, and/or other property determined from the request data. User identifier 202 may receive and process request data for multiple chat requests. For example user identifier 202 may, for each chat request, process request data into user data and retrieve and update additional associated user data from the database 203.

Database 203 may store data. In some embodiments, database 203 may store data used in the operation of pairing system 210. For example, database 203 may store user data. Each of the other illustrated components of system 200 may utilize data stored in database 203. For instance, distance scorer 204 may use user data stored in database 203 to calculate a distance score. In another example, user identifier 202 may use user data stored in database 203 to determine a unique user-id associated with a received chat request. In a still further example, pairing engine 207 may use data stored within database 203 to choose a method for pairing users. Database 203 may store user data in the form of a graph database, as further described below in reference to FIG. 5. For example, database 203 may store data in such a way that a suitable application may construct a graph database in memory, as further described below in reference to FIG. 5.

Distance scorer 204 may use user data obtained by the user identifier 202 and/or data within database 203 to determine distance scores between users. A distance score may comprise a number or other indicator representing the degree of separation between two users. For example, a distance score may be a number indicating the degree of separation between two users on a graph database, as further described below in reference to FIG. 5. Distance scorer 204 calculates a distance score for one or more pairs of users initiating a chat request. In some embodiments, distance scorer 204 may determine distance scores between requesting users and requested users. For example, in embodiments for filtering electronic communications, distance scorer 204 may determine a distance score between a first requesting user and a second requested user, even though the second requested user has not initiated a chat request. Distance scorer 204 may calculate the distance score by using data contained in a graph database, as described further below in reference to FIG. 5.

Collaborative filter scorer (CF scorer) 205 may use user data obtained by the user identifier 202 and/or other data within database 203 to determine collaborative filtering scores (CF scores) between users. A CF score may comprise a number or other indicator representing a predicted preference, as described further below in reference to FIG. 6. In some embodiments, the predicted preference may comprise a predicted preference for engaging in a chat encounter with another user. For example, a CF score may comprise a number between 1 and 5 indicating a predicted preference for a chat encounter with a particular user. In some embodiments, CF scorer 205 calculates one or more CF scores for each pair of users initiating a chat request. In some embodiments, CF scorer 205 may determine CF scores between requesting users and requested users. For example, in embodiments for filtering electronic communications, CF scorer 205 may determine a CF score between a first requesting user and a second requested user, even though the second requested user has not initiated a chat request. CF scorer 205 may calculate the CF score by relying on collaborative filtering techniques, as described further below in reference to FIG. 6.

Pairing scorer 206 may calculate pairing scores between users. In some embodiments, pairing scorer 206 calculates pairing scores between each pair of users initiating a chat request. In other embodiments, pairing scorer 206 calculates pairing scores between requesting users and requested users. Pairing scorer 206 may use one or more of the distance score or the CF score between two users to determine an overall pairing score. Pairing scorer 206 may combine the distance score and CF score between two users into a pairing score. The combination may involve adding, subtracting, multiplying, dividing, or otherwise combining the distance score and CF score using a formula. For example, in an embodiment, the distance score and CF score may each be multiplied by a coefficient and added together to produce a pairing score. In some embodiments, pairing scorer 206 may use the distance score by itself or in combination with a default CF score to produce a pairing score. In some embodiments, pairing scorer 206 may use the CF score by itself or in combination with a default distance score to produce a pairing score.

Pairing scorer 206 may use different methods to produce pairing scores depending on the situation. In some embodiments, pairing scorer 206 may use a different formula to produce pairing scores based on an elapsed time or an amount of available data in database 203. For example, pairing scorer 206 may initially use a formula that weighs distance scores more heavily than CF scores and change the formula over time to weigh distance scores less heavily. In some embodiments, pairing scorer 206 may use different methods to produce pairing scores between different users. For example, pairing scorer 206 may use a default distance score for one pair of users, if the distance score is unavailable or unreliable, but not for another pair of users. For instance, in embodiments where the pairing system is used to filter unwanted messages or spam, pairing scorer 206 may initially use a default distance or CF score for a new user—the potential spammer—and change the formula over time to quickly emphasize the CF score and filter out spammers. In another example, pairing scorer 206 may use a different method for each user depending on the amount of available data for that user in database 203.

Pairing engine 207 may use the pairing scores generated by the pairing scorer 206 to generate or select pairs of users for chat encounters, as described further below in reference to FIG. 3A. Pairing engine 207 may also use the pairing scores generated by the pairing scorer 206 to generate or select pairs of users to determine whether to allow electronic communications between specific users that already engaged in or are engaging in electronic communications, as described further below in reference to FIG. 3B. Pairing engine 207 may then pass pairs of users to chat initiator 208.

Chat initiator 208 may initiate a chat encounter for each pair of users generated by pairing engine 207. In some embodiments, chat initiator 208 initiates a chat encounter by transmitting user data to each of the paired users. The user data, for example, may be a user name, unique user-id, or any other user data sufficient to allow the user device or application to initiate a chat conversation.

Though the present disclosure discusses pairing primarily in the context of matching two users for a chat encounter, it will be appreciated that the term pairing is not so limited. Pairing may encompass matching one user with any number of users. For example, pairing engine 207 may use pairing scores to select groups of users for engaging in group chat encounters. As a result, chat initiator 208 may initiate group chat encounters for each group of users generated by pairing engine 207.

Figure 3A:
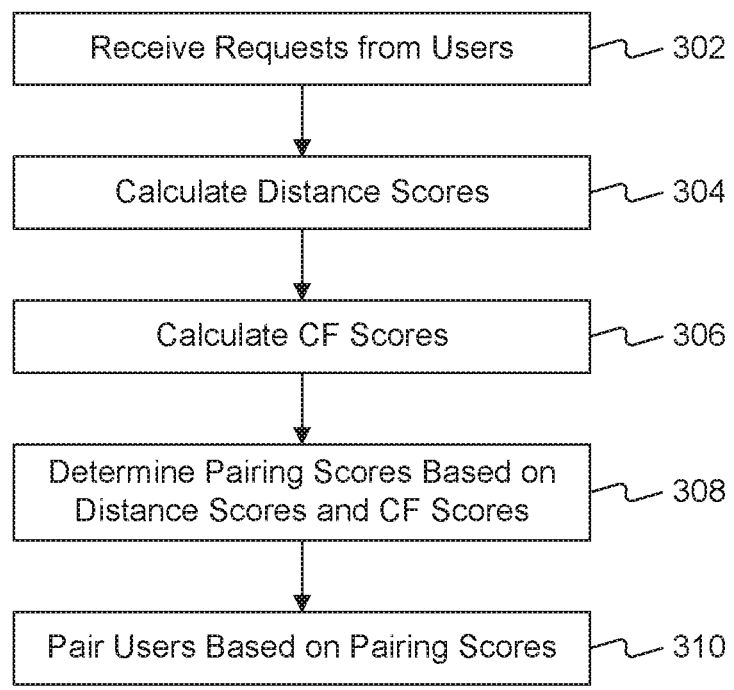
FIG. 3A illustrates a flowchart of an exemplary pairing process, consistent with embodiments of the present disclosure.

FIG. 3A illustrates a flowchart of an exemplary pairing process 300, consistent with embodiments of the present disclosure. As described below, exemplary process 300 may be implemented with one or more of the components illustrated in FIG. 2, but other arrangements and implementations are possible. In some embodiments, exemplary process 300 is implemented with one or more processors. Further, it should be understood that the steps of process 300 may be performed in any order to achieve the objects of the present disclosure. Therefore, the depicted order of FIG. 3A is merely exemplary.

In step 302, user identifier 202 may receive request data, including one or more chat or other electronic communication requests from users. User identifier 202 may process the received request data, along with any previously unprocessed request data, into user data. User identifier 202 may augment this user data with associated user data contained in database 203. The user identifier 202 may also update database 203.

In step 304, distance scorer 204 may calculate distance scores between users that user identifier 202 has received chat or other electronic communication requests for. A distance score may comprise a number or other indicator representing the degree of separation between two users. For example, a distance score may be a number indicating the degree of separation between two users on a graph database, as further described below in reference to FIG. 5. To calculate a distance score, distance scorer 204 may use user data provided by user identifier 202 and/or data stored in a graph database, as described below in reference to FIG. 5.

In step 306, CF scorer 205 may calculate collaborative filtering (CF) scores between users that user identifier 202 has received chat or other electronic communication requests for. CF scores may comprise numbers or other indicators representing predicted preferences, as described further below in reference to FIG. 6. In some embodiments, predicted preferences may include preferences for engaging in a chat or other electronic communication encounter with another user. For example, a CF score may comprise a number between 1 and 5 indicating a predicted preference for a chat encounter with a particular user. In other embodiments, predicted preferences may include an indication of likelihood that the chat or other electronic communication encounter would result in a positive outcome. For example, a CF score may comprise a number indicating whether electronic communications from a particular user to another is spam or would be found offensive or objectionable. CF scorer 205 may use user data provided by user identifier 202 and/or data provided by database 203. Unlike distance scores, CF scores may be generated using collaborative filtering techniques, as described further below in reference to FIG. 6. Database 203 may store such data in the form of a graph database, as described further below in reference to FIG. 6.

In step 308, pairing scorer 206 may calculate pairing scores by combining the distance scores and CF scores. Pairing scorer 206 may generate a pairing score between each pair of users that user identifier 202 has received chat or other electronic communication requests for. A pairing score between two users represents the overall desirability for pairing those users together. As described above in reference to FIG. 2, pairing scorer 206 may calculate pairing scores by combining distance and CF scores.

In step 310, pairing engine 207 may generate pairs of users based on the pairing scores produced by pairing scorer 206 to enable electronic communications. As a result, pairing engine 207 may send data to chat initiator 208 sufficient to allow the paired users to initiate a chat encounter. In some embodiments, pairing engine 207 may send user data to chat initiator 208 to enable chat or other electronic communications. For example, pairing engine 207 may send data including an IP address, a unique user-id, or other data sufficient to identify the paired devices and/or chat applications. Chat initiator 208 may then send the user data, such as the network IP address of the devices corresponding to the paired users, to enable the paired devices to communicate with each other over a network. In some embodiments, the user data may be a user-id sufficient to allow the paired devices to initiate electronic communications through an intermediary server. In some embodiments, the data may include other information, such as data relating to the capabilities of the chat application used by a device. For instance, chat pairing system may transmit data to one device to indicate that another device does not have video capabilities.

Figure 3B:
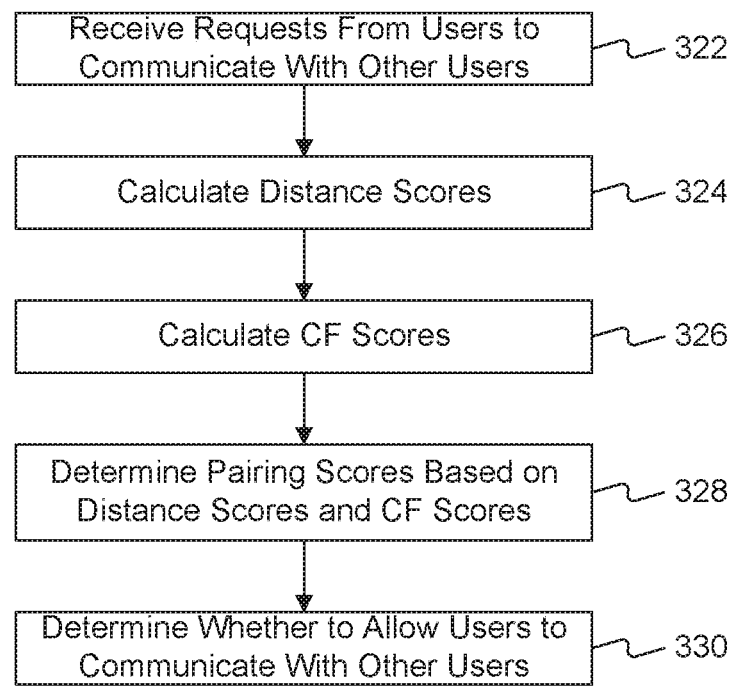
FIG. 3B Illustrates a flowchart of an exemplary filtering process, consistent with embodiments of the present disclosure.

FIG. 3B illustrates a flowchart of an exemplary filtering process 320, consistent with embodiments of the present disclosure. As described below, exemplary process 320 may also be implemented with one or more of the components illustrated in FIG. 2, but other arrangements and implementations are possible. In some embodiments, exemplary process 320 is implemented with one or more processors. Further, it should be understood that the steps of process 320 may be performed in any order to achieve the objects of the present disclosure. Therefore, the depicted order of FIG. 3B is merely exemplary.

In step 322, user identifier 202 may receive request data, including one or more requests from requesting users to chat or otherwise electronically communicate with other users. The requests to communicate may identify one or more requested users with which the requesting user wishes to communicate with. User identifier 202 may process the received request data, along with any previously unprocessed request data, into user data. User identifier 202 may augment this user data with associated user data contained in database 203. The user identifier 202 may also update database 203.

In step 324, distance scorer 204 may calculate distance scores between requesting users and requested users. In some embodiments, distance scorer 204 may calculate distance scores between each requesting user and users other than each respective requested user for purposes of comparison. In some embodiments, distance scorer 204 may also calculate distance scores between each requested user and users other than each respective requesting user for purposes of comparison. A distance score may comprise a number or other indicator representing the degree of separation between two users. For example, a distance score may be a number indicating the degree of separation between two users on a graph database, as further described below in reference to FIG. 5. Distance scorer 204 may calculate a distance score based on user data provided by user identifier 202 and/or data stored in a graph database, as described below in reference to FIG. 5. In step 326, CF scorer 205 may calculate collaborative filtering (CF) scores between requesting users and requested users. In some embodiments, CF scorer 205 may calculate CF scores between each requesting user and users other than each respective requested user for purposes of comparison. In some embodiments, CF scorer 205 may also calculate CF scores between each requested user and users other than each respective requesting user for purposes of comparison. CF scores may comprise numbers, values, or other indicators representing predicted preferences, as described further below in reference to FIG. 6. In some embodiments, predicted preferences may include preferences for engaging in a chat encounter or other electronic communication with another user. For example, a CF score may comprise a number between 1 and 5 indicating a predicted preference for a chat encounter with a particular user. In other embodiments, predicted preferences may include an indication of likelihood that the chat encounter or other electronic communication would result in a positive outcome. For example, a CF score may comprise a number indicating whether electronic communications from a particular user to another is spam or would be found offensive or objectionable. CF scorer 205 may calculate CF scores based on user data provided by user identifier 202 and/or data provided by database 203. CF scores may be generated using collaborative filtering techniques, as described further below in reference to FIG. 6. Database 203 may store such data in the form of a graph database, as described further below in reference to FIG. 6.

In step 328, pairing scorer 206 may calculate pairing scores by combining the distance scores and CF scores. Pairing scorer 206 may generate a pairing score between each pair of requesting and requested users. In some embodiments, pairing scorer 206 may generate pairing scores between each requesting user and users other than the respective requested user for the purpose of comparison. In some embodiments, pairing scorer 206 may also generate pairing scores between each requested user and users other than the respective requesting user for the purpose of comparison. In some embodiments, a pairing score between two users represents the overall desirability for pairing those users together. As described above in reference to FIG. 2, pairing scorer 206 may calculate pairing scores by combining distance and CF scores.

In step 330, pairing engine 207 may generate pairs of users based on the pairing scores produced by pairing scorer 206 to filter electronic communications between requesting and requested users. As a result, pairing engine 207 may send data to chat initiator 208 to allow the paired users to initiate and/or continue a chat or other electronic communication encounter. In some embodiments, pairing engine 207 may send user data to chat initiator 208 to filter electronic communications. For example, pairing engine 207 may send or not send user data to chat initiator 208 to initiate and/or allow electronic communications to continue depending on whether pairing engine 207 pairs a requesting user with a requested user.

In some embodiments, pairing engine 207 may pair two users if their pairing score is above a predefined threshold. For instance, pairing engine 207 may examine pairing scores sequentially and pair two users if the pairing score between them is above a predefined threshold. Pairing engine 207 may then remove from consideration the remaining pairing scores for which already paired users are a part of. In some embodiments, pairing engine 207 may sort received pairing scores. For example, pairing engine 207 may sort pairing scores and pair the users with the highest pairing scores. In some embodiments, pairing engine 207 may pair only those users with the highest pairing scores if their scores exceed a predefined threshold. In some embodiments, the threshold may not be predefined and may instead be based on the collection of pairing scores. For example, the threshold may be based on the average of all pairing scores, pairing scores of a certain percentile, and/or pairing scores that that exceed an average by a certain number of standard deviations. It will be apparent from the present disclosure that thresholds based on other statistical analyses or comparisons may be utilized.

In some embodiments, pairing engine 207 analyzes other pairing scores to determine whether to pair two users or pair a user with a group of users. For example, pairing engine 207 may generate an optimal set of pairings based on a group of pairing scores. In some embodiments, pairing engine 207 may not pair the two users with the highest pairing score because another set of pairings results in a higher overall cumulative pairing score. For example, in a scenario with the following pairing scores (higher is better), {1-2: 9 | 1-3: 7 | 1-4: 8 | 2-3: 4 | 2-4: 6 | 3-4: 1}, pairing engine 207 may not pair user 1 with 2, despite a pairing score of 9, as it would leave users 3 and 4 with a pairing score of 1. This results in an overall cumulative pairing score of 10. Pairing engine 207 may instead pair user 1 with 3 and user 2 with 4. The respective pairs would have pairing scores of 7 and 6, producing a cumulative pairing score of 13. In some embodiments, pairing engine 207 may generate an optimal set of pairings based on other factors. For example, pairing engine 207 may incorporate the time elapsed since request receiver 201 received requests from each of the users seeking a chat encounter.

In the previous example, a higher pairing score represented a more desirable pairing score. It will be appreciated that in some embodiments, different pairing scores may be more or less desirable. For example, in an embodiment, pairing engine 207 may pair users with a pairing score below a certain threshold. In other embodiments, a pairing score may be more or less desirable depending on its proximity to a number. For example, in an embodiment, pairing engine 207 may pair users depending on how close their pairing score is to the number 1. The present disclosure also contemplates other scoring relationships. Accordingly, the words used to compare pairing, distance, or CF scores, such as "higher" or "highest" are presented by way of example only and are non-limiting.

In some embodiments, pairing engine 207 may select the set of pairing scores with the highest cumulative pairing scores. In some embodiments, pairing engine 207 may select the set of pairing scores above a predefined threshold with the highest cumulative pairing score. In other embodiments, pairing engine 207 may select pairing scores based on one approach, another approach, or a combination of approaches depending on the situation. For example, pairing engine 207 may pair two users with the highest pairing score when it has received only a few pairing scores and select the best set of pairing scores when it has received many pairing scores.

In some embodiments, pairing engine 207 may vary the threshold for selecting pairing scores based on the situation. Pairing engine 207 may vary the threshold for all users at the same time. For example, pairing engine 207 may vary the threshold for pairing users based on an elapsed amount of time. In some embodiments, pairing engine 207 may increase the threshold as time passes. For example, pairing engine 207 may initially use a low threshold for all users and increase the threshold as time passes. Pairing engine 207 may increase the threshold, for example, as database 203 stores more information. In another example, pairing engine 207 may vary the threshold based on the amount of users requesting chat encounters. Pairing engine 207, may, for instance, incrementally increase the threshold as more users request chat encounters.

Pairing engine 207 may vary the threshold on a user by user basis. In some embodiments, pairing engine 207 may vary the threshold for a particular user based on the amount of elapsed time waiting for a chat encounter. For example, pairing engine 207 may incrementally decrease the threshold for a particular user as time passes. In some embodiments, pairing engine 207 may vary the threshold for a particular user based on the number of successful or unsuccessful previous pairings. Whether a pairing is successful or unsuccessful may be determined, for example, from explicit or implicit feedback, as described further below in reference to FIG. 6. For example, pairing engine 207 may incrementally increase the threshold for a user as the user has more unsuccessful chat encounters in order to reduce the likelihood of another unsuccessful encounter. In another example, pairing engine 207 may decrease the threshold for a particular user if that user has recently had a successful chat encounter, (e.g., as a result of another user indicating that the chat encounter was not spam).

Figure 4:
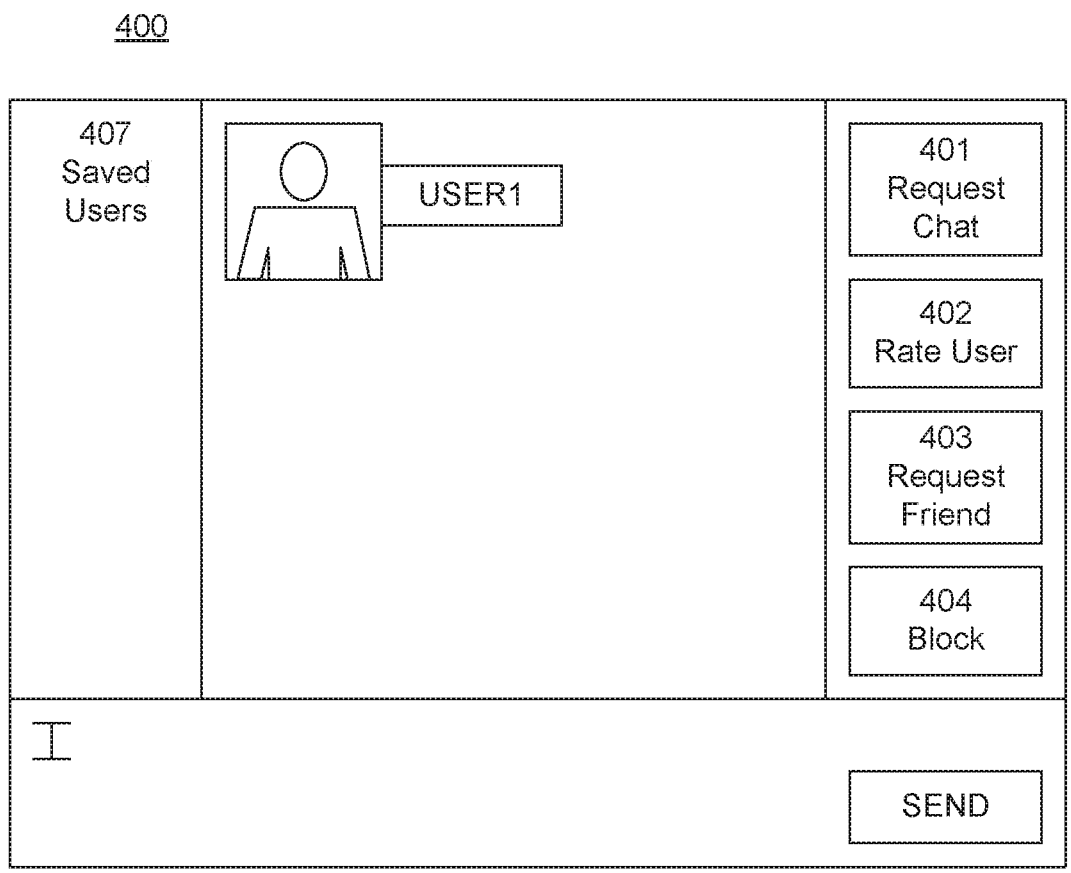
FIG. 4 illustrates an exemplary graphical user interface (GUI) for a chat application, consistent with embodiments of the present disclosure.

FIG. 4 illustrates an exemplary graphical user interface (GUI) for chat application 400. In some embodiments, chat application 400 includes a contacts list 407. Chat application 400 may further include request chat button 401, rate user button 402, request friend button 403, and block button 404. The number and arrangement of components and features in FIG. 4 may vary and are provided by way of illustration only. For instance, it will be appreciated that a different GUI may be appropriate for a chat application that utilizes video, voice, or other means of communication. Different GUIs may also be appropriate for different platforms. For example, a phone or tablet may employ a different GUI with additional or omitted features. Further, other embodiments may omit the features of FIG. 4 entirely. For example, a GUI may omit chat request button 401 if the user has authorized implicit chat requests, such as through an opt-in feature.

In an embodiment, chat application 400 may interact with system 200. Chat application 400 may initiate a chat encounter by, for example, sending a chat request. The chat application may send a chat request in response to user input through, for example, mouse, keyboard, touchscreen, or other user input. In an embodiment, the user input may interact with request chat button 401. In some embodiments, the chat application 400 sends the chat request to request receiver 201. In an embodiment, the chat application 400 may send the chat request to one or more intermediaries, such as servers, computers, or other computing devices. These devices may then forward the chat request to request receiver 201.

Rate user button 402 may allow the explicit rating of other users. In some embodiments, rate user button 402 may open a dialog that allows the user enter a rating for the current chat encounter. In some embodiments, the entered rating may comprise a thumbs-up rating, a thumbs-down rating, or both. In some embodiments, the entered rating may comprise a number of stars or a numerical rating. The present disclosure contemplates other rating systems. For example, in an embodiment, rate user button 402 may place a limit on one or more of positive or negative ratings during a given time period. In some embodiments, the rating system may include tags such as "interesting," "funny," or other tags that describe the chat encounter. In other embodiments, rate user button 402 may allow for only positive or only negative ratings. For example, in an embodiment, rate user button 402 may comprise a button to block future communications or indicate that a particular chat encounter constitutes spam or is otherwise unwanted.

In some embodiments, entering a rating after interacting with rate user button 402 may transmit a rating message to system 200. As a result of the message, database 203 may store the rating information. For example, database 203 may store the rating information as user data for the rating user, the rated user, or both. User identifier 202 may later retrieve the rating information in the form of user data. In some embodiments, distance scorer 204 and CF scorer 205 may use stored rating information to calculate distance and CF scores, as described below in reference to FIGS. 5-6.

Request friend button 403 may allow saving of the current chat partner's contact information. Contact information may comprise sufficient information for chat application 400 to initiate another chat encounter with the current chat partner at some point in the future without requesting a chat encounter. For example, contact information could include a unique user-id, an IP address, username, or other information sufficient to initiate a chat encounter. In some embodiments, request friend button 403 saves the contact information only if both participants of the chat encounter agree. For example, a requesting user interacting with request friend button 403 may cause a dialog to appear on the other user's screen. The dialog may ask whether the other user agrees to the requesting user's saving of their contact information. In other embodiments, request friend button 403 may save contact information without requiring agreement of both participants. For example, a requesting user may save the other user's contact information by interacting with request friend button 403, but may require approval before initiating another chat encounter.

Saved user area 407 may display a list of contacts. In some embodiments, the contacts may include contact information saved by interacting with request friend button 403. For example, saved user area 407 may include contact information for a user from a previous chat encounter initiated by system 200. In some embodiments, saved user area 407 may include contact information from other sources, wholly unrelated to system 200. For example, saved user area 407 may include contacts to previously known users, such as family members, friends, coworkers, and the like. Saved user area 407 may further include referred contacts.

Saved user area 407 may display contact names associated with saved contact information. In some embodiments, saved user area 407 may display randomly generated contact names. For example, saved user area 407 may display a username in the form of a randomly generated number such as 376204784268. In other embodiments, saved user area 407 may display contact names that are only partially randomly generated. For instance, saved user area 407 may display "New York #####" as the username, where "#####" represents a string of random numbers. In some embodiments, saved user area 407 may allow a user to change the displayed contact names into custom names. For example, saved user area 407 may allow a user to change the display name of "376204784268" to "funny person." Saved user area 407 may display user names as a result successful interaction with request friend button 403. Saved user area 407 may also display user names from other sources.

Chat application 400 may automatically prune the contact names displayed by saved user area 407. In some embodiments, chat application 400 automatically deletes or "forgets" elements of the contact names displayed by saved user area 407 after a period of time or under certain conditions. For example, chat application 400 may delete custom names assigned by a user and change those names into randomly generated names. In some embodiments, chat application 400 automatically "forgets" saved contact information altogether after a period of time or under certain conditions. For example, chat application 400 may automatically delete contact information after a predefined period has elapsed since interacting with a contact. In another example, chat application 400 may delete contact information after the user interacts with block button 404.

Block button 404 may allow the user to prevent future chat encounters with the current chat partner. For example, interacting with block button 404 may transmit a block message to system 200 that prevents future pairing between the two currently chatting users. As a result of the message, database 203 may store information preventing future pairings. Consequently, chat pairing system 110 may only generate pairing scores between a subset of the users 130 because of stored information preventing future pairings. For example, if a user had previously engaged in a chat encounter with another user during which either interacted with block button 404 or its equivalent in another application, chat pairing system 110 may not generate a pairing score between these two users. In some embodiments, chat pairing system 110 may instead generate a default low or poor score between two users that had previously blocked each other. For example, block button 404 may alternatively or additionally cause transmission of a rating message to system 200. Block button 404 may additionally transmit a thumbs-down rating or zero-star rating. As a result, database 203 may store the rating as user data.

Figure 5:
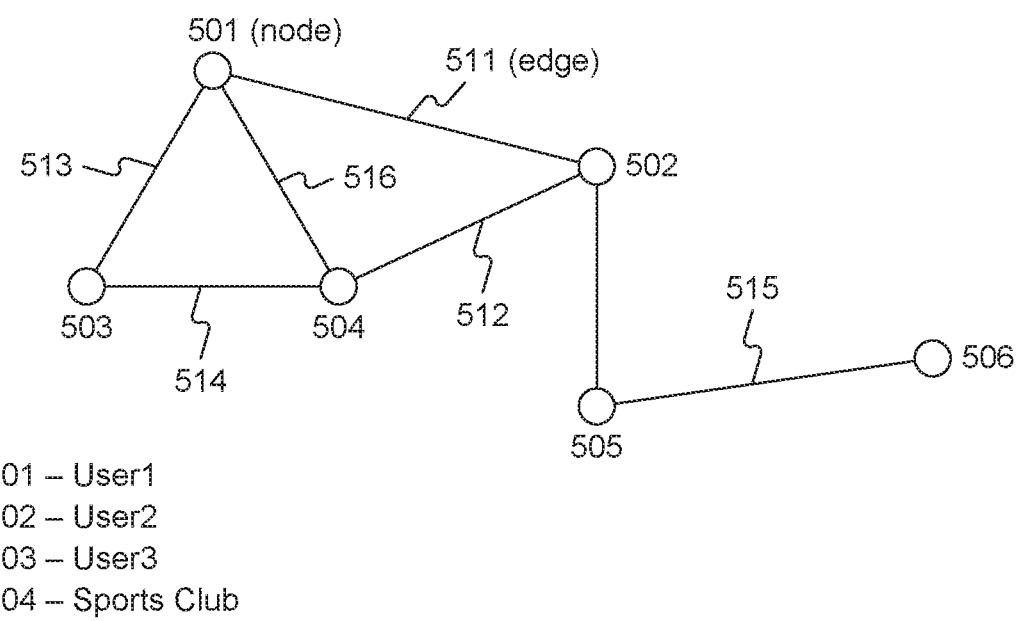
FIG. 5 is a representation of part of an exemplary graph database, consistent with embodiments of the present disclosure.

FIG. 5 displays a representation of part of an exemplary graph database 500, consistent with embodiments of the present disclosure. Graph database 500 may be used with pairing system 200. Graph databases may utilize graph structures with nodes (also referred to as "vertices"), edges, and properties to organize and store data. Some graph databases may not be property-based. Graph database 500 may contain nodes, which are represented by circles in FIG. 5.

In the example depicted in FIG. 5, graph database 500 includes nodes 501-506. Nodes 501-506 may each contain properties. Properties of nodes may convey a quality of the subject of the node. For example, node 501 may contain a property describing the node as a user. Graph database 500 may also contain edges, which are represented by lines. Edges may also contain properties. Properties of edges may convey a quality of the subject of the edge. In the example depicted in FIG. 5, graph database 500 includes edges 511-516. In some embodiments, graph database 500 may be part of a larger graph database. For example, graph database 500 may be part of a larger graph database used for purposes other than pairing users, such as advertising or social networking.

Graph database 500 may reside within one or more storage or memory devices. For example, graph database 500 may reside within database 203. Graph database 500 may comprise a collection of nodes, edges, and properties. For example, the Neo4j or Titandb graph implementation may be used for graph database 500. In some embodiments, database 203 contains sufficient information to construct graph database 500 from data stored within database 203. For example, database 203 may contain data sufficient to construct a graph database in RAM. Database 203 may, for example, store graph database 500 in the form of a relational or other non-graph-based database and construct graph database 500 in memory.

Graph database 500 may comprise data that represent or specify information about users. In some embodiments, some of the nodes within graph database 500 may represent users. For example, as depicted in FIG. 5, node 501 may represent user 1 and node 502 may represent user 2. Each node may additionally include properties associated with the subject of the node. For example, node 501, which refers to and represents user 1, may include properties describing user 1. In an embodiment, node 501 may include properties such as a user name, unique user-id, location, and/or other personal data. Node 501 may also include other user data, such as a device type associated with the user, chat application type, and device capabilities. Further, node 501 may include user data wholly unrelated to the operation of pairing system 200. For example, graph database 500 may be part of a larger graph database that serves multiple purposes, only one of which involves the operation of pairing system 200. In some embodiments, nodes within graph database 500 may represent things other than users. For example, node 504 may represent a sports club associated with nodes 501-503. Node 504 may also include properties describing the sports club such as location, membership, and/or capabilities.

Graph database 500 may represent relationships between users. In some embodiments, edges between nodes that represent users may represent a relationship between those users. Edges may store the relationship between the nodes as one or more properties of the edge. For example, edge 511 between nodes 501 and 502 may represent a relationship between user 1 and user 2. In an embodiment, edge 511 may represent a previous chat encounter, a rating for a previous chat encounter, a previous election to block the other user, a previous election to save contact information, or any other information relating nodes 501 and 502. Edge 511 may also include relational information unrelated or tangential to the operation of pairing system 200. For instance, edge 511 may indicate familial relationships, mutual membership in an organization, or the like.

Graph database 500 may obtain data in a variety of ways. In some embodiments, graph database 500 is or is part of a larger graph database that already exists. For example, graph database 500 may be a database that tracks users for another purpose, such as advertising, web-browsing, movie streaming, and/or other activity capable of generating user data. In some embodiments, graph database 500 obtains data as a result of user input. For example, graph database 500 may create a new node and update a user name property upon creation of an account. In another example, graph database 500 may update a password property upon a password change request. Graph database 500 may populate newly created nodes with information supplied during account creation. For instance, graph database 500 may store basic user information, such as name, email address, and password, as properties of the newly created node. In some embodiments, graph database 500 may store default information as properties of the node. For example, graph database 500 may store default preferences in the absence of preference data.

Graph database 500 may create edges between the newly created node and the rest of the graph database. For example, graph database 500 may store "referral" as a property of an edge if the newly created node was the product of a user referral. In some embodiments, graph database 500 may create default edges between newly created nodes and the rest of the graph database to ensure each node is connected to other nodes through edges. For example, graph database 500 may create an edge connecting newly created nodes with a node representing a "new users" group. In some embodiments, graph database 500 may create random or semi-random edges between the newly created node and the rest of the graph database to ensure that newly created nodes have some initial starting connections. For example, graph database 500 may create a number of randomly generated edges between the newly created node and other pre-existing nodes. In another example, the generated edges may be based in part on collected user data.

Graph database 500 may obtain data automatically. In some embodiments, graph database 500 may obtain data automatically upon account creation, without express user input. For example, graph database 500 may store intrinsic user data upon account creation such as the user's IP address and other intrinsic data that may be automatically obtained, such as general location, rural or urban location, time of account creation, and type of device used. In another example, automatically obtained data may include the language used by the user. In some embodiments, graph database 500 automatically obtains data from users initiating chat requests. For example, chat application 400 may send user data when initiating a chat request or upon login. The user data may include, for example, the identity of the user, an IP address, the capabilities of the chat client, or other user information. In some embodiments, graph database 500 obtains data during a chat encounter. For instance, chat application 400 may send user data such as chat duration, chat keywords, chat speed (words per minute or the like), or other indicators of chat quality. These indicators could include feedback elements such as whether the chat encounter used emoticons, images, audio, or video.

In some embodiments, graph database 500 obtains data after the conclusion of a chat encounter. For example, a user may interact with rate user button 402 and provide a rating for the chat encounter and other user. As a result, graph database 500 may create an edge between the rating user and the rated user describing the rating. In another example, a user may interact with request friend button 403 or block button 404. As a result, graph database 500 may update the database to reflect the friendship or blocked status. For example, graph database 500 may update a node to include a user data property describing another node as a friend. Alternatively or in addition, this same information could be added to graph database 500 in the form of an edge and associated edge property. For instance, graph database 500 could add an edge between the two users indicating friendship or blocked communications.

As described above, in step 304, distance scorer 204 may calculate a distance score between users. Distance scorer 204 may use information contained in graph database 500, which database 203 may store. In exemplary embodiments, distance scorer 204 may calculate a distance score between two users based on graph database 500. For example, distance scorer 204 may calculate a distance score between user 1 and user 2 represented by nodes 501 and 502 respectively by calculating the number of edges or "hops" separating the nodes. In the example graph database 500 depicted in FIG. 5, distance scorer 204 may calculate a distance of 1 edge between users 1 and 2 represented by nodes 501 and 502 respectively. Likewise, distance scorer 204 may calculate a distance of 2 edges between users 2 and 3 represented by nodes 502 and 503 respectively.

In some embodiments, distance scorer 204 may calculate a distance score that takes into account properties associated with edges. For example, in an embodiment, edge 511 may include a property representing the physical distance between user 1 and user 2, represented by nodes 501 and 502 respectively. Edge 511, in this example, may include a property describing the distance between user 1 and user 2 as 3.5 units of distance. Distance scorer 204 may then return 3.5 units as the distance between users 1 and 2 instead of the 1 edge returned in the previous example.

Distance scorer 204 may consider other properties associated with edges. In some embodiments, distance scorer 204 may calculate a distance score based on the number of interactions between two users. For example, edge 511 may include a property counting the number of interactions, involving pairing system 210 or otherwise. Distance scorer 204 may calculate a distance by, for example, computing the inverse of the number of interactions to reflect a shorter distance for a greater number of interactions. In another example, distance scorer 204 may consider the number and type of associations between two nodes in calculating a distance score. For example, nodes 501 and 502 may have several edges between them, including edge 511. Accordingly, distance scorer 204 may, in calculating the distance between nodes 502 and 503, consider the number and type of edges between nodes 501 and 502. For instance, distance scorer 204 may calculate a lower distance between nodes 502 and 503 as a result of a higher number or quality of edges between nodes 501 and 502.

In some embodiments, distance scorer 204 may use other values as distance values. For example, as described above, edge 511 may represent a rating for a previous chat encounter. Distance scorer 204 may use this value in calculating the distance between node 501 and 502. For example, edge 511 may include a property defining user 1's rating of user 2 in number of stars from 1-5. In this example, distance scorer 204 may return the inverse of the star rating as the distance. For example, if user 1 rated user 2 with 5 stars, distance scorer 204 may calculate the distance between the two users as 0.2 to indicate a distance that is "closer" than 0.5 (the equivalent distance for a 2 star rating). Distance scorer 204 may use other methods to calculate a distance score based on properties stored in an edge. For example, distance scorer 204 may transform the property using a formula to make the property more comparable to CF scores.

Distance scorer 204 may consider the properties of multiple intervening edges to calculate a distance score. To illustrate, distance scorer 204 may consider properties of both edge 511 and edge 513 to calculate the distance score between the users represented by nodes 502 and 503. In some embodiments, distance scorer 204 may combine multiple properties of a single edge in calculating a distance score. For example, distance scorer 204 may combine a geographical distance property with a rating property, both of which may be stored as properties of edge 511 or as properties of separate edges. In some embodiments, distance scorer 204 transform these properties by a formula. For example, distance scorer 204 may multiply each of these properties by a coefficient and add them together to calculate a distance score.

Distance scorer 204 may calculate a distance score based on the age or "staleness" of a property. To illustrate, edge 511 connects node 501 and 502. Edge 511 may include a rating property in the form of a thumbs-up rating. Edge 511 may also include a timestamp indicating that the rating property was updated 2 months ago. Distance scorer 204 may calculate a distance score by multiplying, or otherwise combining, the time elapsed since the rating property was updated by the rating property. For example, by multiplying the elapsed time by the rating property, distance scorer 204 may calculate a higher distance score for older, more stale, ratings than for newer, fresher ratings It will be appreciated that graph database 500 illustrated in FIG. 5 is an exemplary portion of a graph database and provided only for illustrative purposes. A graph database suitable for pairing system 200 may be implemented with any suitable configuration or structure. In some embodiments, for example, graph database 500 may represent a particular user with more than one node. In common embodiments, graph database 500 includes multiple edges between nodes to represent multiple relationships. In some embodiments, graph database 500 may represent user data in the form of edges rather than properties. For instance, each user node may include an edge describing the user name to a node representing user names. In some embodiments, graph database 500 may represent relationships between users as node properties instead of edges. For example, node 501 may include a property describing a previous chat with node 502 instead of edge 511. Many other variations are possible. It will thus be appreciated that graph database 500 is provided for illustrative purposes only.

Figure 6:
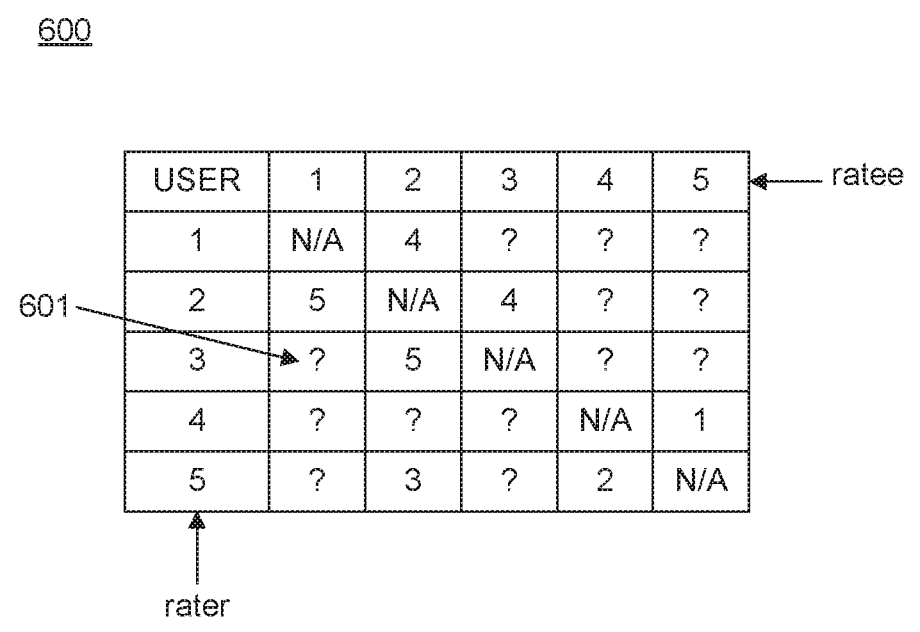

FIG. 6 illustrates an exemplary problem solved by collaborative filtering. Consistent with embodiments of the present disclosure, collaborative filtering may filter for information or patterns using techniques involving collaboration among multiple agents, viewpoints, and/or data sources. Collaborative filtering may involve very large data sets and may be applied to many different kinds of data. In some embodiments, collaborative filtering may be implemented as part of a computerized method of making predictions (filtering) about the interests of a user by collecting preferences or tastes of many users (collaborating).

As illustrated in FIG. 6, CF scorer 205 may use collaborative filtering techniques to calculate CF scores between users. CF scores may represent the predicted preference of one user for another user based on a collaborative filtering technique. FIG. 6 depicts an exemplary table 600 of user preferences for chatting with other users. Table 600 is provided for illustration purposes only. The data contained within table 600, in the form of user preferences for chatting with other users, may be stored within a graph database, as described further above in reference to FIG. 5.

Table 600 records the preferences of the users in the left column for chatting with users represented in the top row. For instance, user 2 has a preference of 5 for chatting with user 1, and user 5 has a preference of 2 for chatting with user 4. Table 600 includes a diagonal of "N/A" since users' preference for chatting with themselves is not relevant to this particular discussion.

As shown in FIG. 6, table 600 includes known user preferences for some user pairs. These known user preferences are represented in exemplary table 600 by numbers. Table 600, however, includes question marks "?" to indicate user preferences that table 600 does not have information for. For instance, the value 601, denoted by a question mark, represents the preference for user 3 to engage in a chat encounter with user 1. The value for this preference is unknown in this example. Accordingly, CF scorer 205 may use data contained in a graph database, as described above with reference to FIG. 5, which database 203 may store, to calculate a predicted value for 601. For example, CF scorer 205 may use data in conjunction with collaborative filtering techniques to calculate the predicted value of 601. In some embodiments, CF scorer 205 may calculate a high score for value 601 representing a high likelihood that user 3 will prefer a chat encounter with user 1. For instance, CF scorer 205 may use the high preference of user 2 for user 1 (5) and the high preference of user 3 for user 2 (4) to help predict the preference of user 3 for user 1.

In some embodiments, CF scorer 205 may calculate CF scores only under certain conditions. For example, CF scorer 205 may, depending on the collaborative filtering technique used, only calculate CF scores if database 203 and/or the graph database contain sufficient collaborative information to calculate a CF score. In another example CF scorer 205 may calculate CF scores only if database 203 contains sufficient information to calculate a CF score exceeding a certain quality or confidence level. For example, CF scorer 205 may only calculate a CF score if a certain number of parameters or data points are available. In another example, CF scorer 205 may use a CF technique that calculates a CF score and modifies it based on the quality or confidence level. In some embodiments, CF scorer 205 may provide a default collaborative filtering score in the absence of sufficient collaborative data.

It will be appreciated that FIG. 6 is provided for illustration purposes only and database 203 may not store user preference data in table format. For example, database 203 may store user preference data in the form of a graph database such as that described above with reference to FIG. 5. Database 203 may also store user preference data in another form and construct a graph database from the stored data. As described above, database 203 may store known user preferences for other users in the form of edges connecting nodes in a graph database. Database 203 may, in addition or alternatively, store user preferences in the form of node properties. In some embodiments, database 203 may represent unknown user preferences, such as value 601, through the absence of an edge or node preference. For example, in exemplary graph database 500, node 503 representing user 3 may lack edge 513 connecting it to node 501 to indicate a missing user preference. In other embodiments, database 203 may reflect unknown user preferences by creating an edge or user preference with a NULL or "unknown" property. The present disclosure contemplates other methods of storing preference information. Accordingly, it will be appreciated that FIG. 6 is provided by way of example only, to illustrate the operation of collaborative filtering techniques.

Referring again to FIG. 6, table 600 also shows user preferences for each pair of users. For instance, Table 600 shows user 2 having a preference of 5 for user 1, and shows user 1 having a preference of 4 for user 2. In some embodiments, CF scorer 205 may calculate two CF scores, each representing the preference of one of the users in a pair for chatting with the other. In some embodiments, CF scorer 205 may use one or more of these scores or may alternatively combine the scores into a single CF score for a particular pair of users. The present disclosure refers to CF scores between a pair of users in the singular. It will be appreciated, however, that CF scorer 205 may produce more than one CF score, based on one or more collaborative filtering techniques. For example, CF scorer 205 may produce one CF score for each of the users in a given pair. Accordingly, in some embodiments, "CF score" refers to one or more of these scores or a combination of these scores. For example, pairing scorer 206 may use a combined CF score or multiple CF scores, along with a distance score, to calculate a pairing score.

In some embodiments, CF scorer 205 may use proven collaborative filtering techniques. To establish recommendations, collaborative filtering techniques may need to compare fundamentally different objects, users and items. Users may represent the entity expressing a preference. Items may represent things for which users express preferences for. Here, items may be other users for which CF scorer 205 calculates a predicted preference for.

In some embodiments, CF scorer 205 may use collaborative filtering techniques that fall into the categories of latent factor models or neighborhood models. Neighborhood models may focus on computing the relationship between users and items (here, other users or potential chat partners). In some embodiments, neighborhood models may utilize an item or user oriented approach. For example, a neighborhood model may determine the preference of user 1 for chatting with user 3 based on user 1's ratings of chats with other users similar to user 3. In another example, a neighborhood model may determine the preference of user 1 for chatting with user 3 based on ratings of user 3 by other users similar to user 1. Examples of neighborhood models include, but are not limited to the Pearson correlation method, vector cosine method, locality-sensitive hashing, and nearest neighbor mechanism.

In some embodiments, CF scorer 205 may utilize a latent factor model. Latent factor models, such as Singular Value Decomposition (SVD), may transform users and items to the same latent factor space. These models may try to explain ratings by characterizing users and items on factors automatically inferred from user feedback. For example, where the items are movies, factors might measure obvious dimensions such as comedy vs drama, amount of action, orientation to children, or even less well defined dimensions such as quirkiness. As applied to pairing system 210, CF scorer 205 may use a latent factor model to measure dimensions such as interests in sports, education, hobbies, and other user dimensions. In some embodiments, CF scorer 205 may use collaborative filtering techniques that include, but are not limited to pLSA, neural networks, Latent Dirichlet Allocation, and SVD. For example, in particular embodiments, CF scorer 205 may use the alternating least squares algorithm implemented by MLlib on a Spark cluster computing system.

In some embodiments, CF scorer 205 may use other collaborative filtering techniques that do not fall into the previous categories. In particular embodiments, CF scorer 205 may implement a hybrid of a neighborhood and latent factor model. Further, CF scorer 205 may use other filtering techniques or processes that do not fall within the previous categories. The foregoing examples are provided by way of example only and are not intended to be limiting. Other collaborative filtering techniques may be utilized in view of the present disclosure.

CF scorer 205 may use collaborative filtering techniques that allow chat initiator 208 to explain the particular user pair selected by pairing engine 207. For example, CF scorer 205 may use an item oriented neighborhood model that pairs users based on their past ratings of similar items (e.g., target users). The item oriented neighborhood model may allow chat initiator 208 to provide an explanation for a particular chat encounter to the user. For example, chat initiator 208 may cause chat application 400 to display a message such as: "paired, in part, because of your rating of [user 3]" or "paired because of your location." Providing such a message may enrich the user's experience and encourage users to interact more frequently with rate user button 402, thus increasing the preference information stored in database 203.

In some embodiments, CF scorer 205 may use both explicit and implicit feedback data stored in database 203, in conjunction with a collaborative filtering technique, to calculate CF scores. Explicit feedback may include explicit or affirmative input from users regarding items (e.g., other users). In some embodiments, explicit feedback may include, for example, a user rating, a chat encounter rating, an election to block a particular user, an indication that a user is a spammer, or an election to save a contact. For example, a user may interact with rating button 402 to provide explicit feedback about a chat encounter. The rating provided by the user may be stored in database 203 as part of a graph database. The graph database may store the rating as a node property or an edge connecting two nodes. CF scorer 205 may use the stored explicit feedback, in conjunction with a collaborative filtering technique, to calculate CF scores for other pairs of users. For instance, CF scorer 205 may use a stored rating to help calculate predicted ratings for similar users.

In some embodiments, CF scorer 205 may use implicit feedback data stored in database 203. Implicit feedback may indirectly reflect opinion through observed user behavior, in the absence of affirmative or explicit user input. In some embodiments, implicit feedback may include, for example, chat duration, chat speed (words per minute), use and number of emoticons, choice of words, such as verbs or pronouns, images, audio, or even mouse movements or keystrokes. For example, a user may engage in a chat encounter through chat application 400 for an extended period of time signifying a successful chat encounter. In an embodiment, upon termination of the chat encounter, chat application 400 may transmit a message to pairing system 210 indicating the duration of the chat encounter. Pairing system 210 may then save the information as positive implicit feedback in database 203 in the form of an edge, in a graph database, between nodes representing the two users involved in the chat.

In some embodiments, CF scorer 205 may use explicit feedback to determine the significance of implicit feedback or other factors. For example, CF scorer 205 may determine the commonality between functional words or use of pronouns during past conversations in relation to explicit feedback giving for that conversation. A high commonality between certain words and high explicit feedback may indicate, for instance, that those words are positive implicit feedback. On the other hand, a high commonality between certain words and low explicit feedback may indicate that those words are negative implicit feedback.

In some embodiments, CF scorer 205 may further use other factors to calculate a CF score. For instance, CF scorer 205 may consider timestamps attached to implicit and/or explicit feedback. CF scorer 205 may further determine a commonality between certain times and higher and lower ratings. As a result, CF scorer 205 may calculate CF scores based in part on the current time. In another example, CF scorer 205 may consider a user's current distance from their normal location in calculating a CF score. CF scorer 205 may determine a commonality between a high distance and low explicit feedback. As a result, CF scorer 205 may generate lower CF scores for users away from their normal location. Thus, CF scorer 205 may calculate CF scores based on implicit feedback, explicit feedback, as well as other non-feedback factors.

CF scorer 205 may use stored implicit feedback, in conjunction with a collaborative filtering technique, to calculate CF scores for other pairs of users. In a particular example, for instance, CF scorer 205 may use both implicit and explicit information, in conjunction with the $SVD_{++}$ matrix factorization model, to calculate predicted ratings for other users. CF scorer may treat implicit information in the same manner as explicit feedback information. In some embodiments, CF scorer may treat implicit information differently from explicit feedback information. For example, CF scorer 205 may use the MLlib alternating least squares implementation to incorporate both implicit and explicit feedback information by treating implicit feedback as a combination of binary preferences and confidence values. For instance, CF scorer 205 may treat a previous chat encounter of a long duration as a positive binary preference with a value of 1 multiplied by an appropriate confidence value (e.g., 20%). In some embodiments, CF scorer may similarly modify explicit feedback information with a confidence value. For example, CF scorer 205 may use a confidence value based on the age or staleness of the explicit feedback information.

CF scorer 205 may use one or more collaborative filtering techniques that provide additional benefits beyond filtering for user preferences. In some embodiments, CF scorer 205 may use a collaborative filtering technique that automatically prevents abuse by users. For example, CF scorer 205 may use a collaborative filtering technique that automatically filters out "chat trolls." A chat troll may be an individual who sows discord by starting arguments or upsetting others by deliberately provoking emotional responses or making offensive statements. CF scorer 205 may use a collaborative filtering technique that automatically filters trolls by calculating low or undesirable CF scores between chat trolls and other users that are not interested in chatting with a troll. For example, CF scorer 205 may calculate a poor score between a chat troll and a user as a result of other low ratings and/or block elections for the troll. In some embodiments, CF scorer 205 may weigh initial feedback for new users more heavily to quickly weed out chat trolls. In some embodiments, CF scorer 205 may use a collaborative filtering technique that calculates high CF scores between trolls and other users that enjoy chatting with trolls. For example, CF scorer 205 may use a technique that results in high CF scores between trolls. In that example, trolls initiating chat requests may have a higher chance of pairing with another troll, thereby enhancing their chatting or "trolling" experience, as the case may be.

Figure 7:
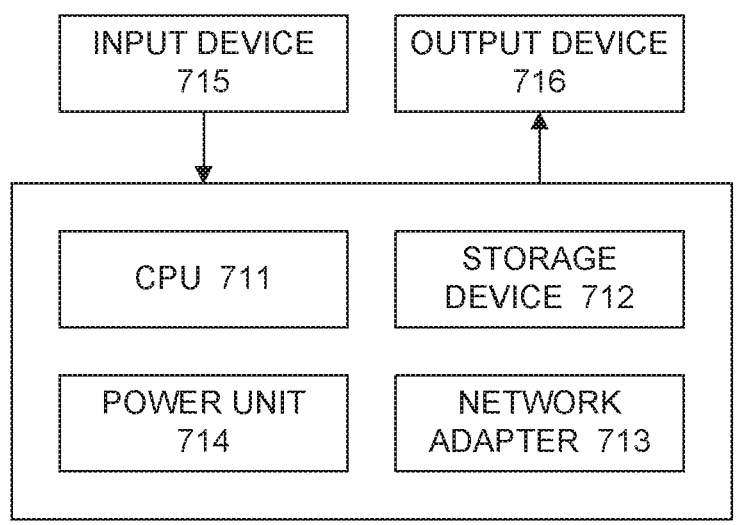
FIG. 7 illustrates an exemplary system for implementing embodiments of the present disclosure.

As shown in FIG. 7, exemplary system 700 may include a central processing unit 711 (also referred to as an electronic processor or CPU) for managing and processing data, and performing operations, consistent with the present disclosure. In some embodiments, CPU 711 may be implemented as one or more processors. System 700 also includes storage device 712. Storage device 712 may comprise optical, magnetic, signal, and/or any other type of storage device. System 700 may also include network adapter 713. Network adapter 713 may allow system 700 to connect to electronic networks, such as the Internet, a local area network, a wide area network, a cellular network, a wireless network, and/or any other type of network. System 700 also includes power unit 714, which may enable system 700 and its components to receive power and operate fully.

In some embodiments, system 700 may also include input device 715, which receives input from users and/or modules or devices. Such modules or devices may include, but are not limited to, keyboard, mice, trackballs, trackpads, eye-tracking devices, scanners, input or touch-sensitive screens, cameras, and other devices which connect via Universal Serial Bus (USB), serial, parallel, infrared, wireless, wired, or other connections. System 700 also includes output device 716, which transmits data to users and/or modules or devices. Such modules or devices may include, but are not limited to, computer monitors, televisions, screens, projectors, printers, plotters, and other recording/displaying devices which connect via wired or wireless connections.

In an exemplary embodiment, system 700 may implement some or all of the components depicted in FIG. 2. For example, system 700 may implement all of the features of pairing system 200. In some embodiments, system 700 may perform some or all of the features depicted in FIG. 4. For example, system 700 may execute instructions to display the GUI of chat application 400 on output device 716 and receive user input through input device 715.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A computer-implemented method for pairing user devices for establishing electronic communications over an electronic network, the method including the following operations performed by at least one processor:

receiving, by a system processor, a request from a first user device of a first user, wherein the request includes request data indicating that the first user is requesting electronic communications of a first type with a second user via a second user device, wherein the first type is one of a voice, a text, and a video capability of one of the first user device and the second user device;

generating, by the system processor, a first pairing score pertaining to the first user device of the first user and the second user device of the second user, the first pairing score being based on a collaborative filtering score and a distance score between the first user and the second user and a distance score between the first user and a third user;

based on the generated first pairing score and a pairing score threshold, selecting, by the system processor, the second user for establishing the electronic communication of the first type with the first user; and initiating, using the system processor, electronic communications by transmitting user data of the first user and the first user device, and user data of the second user and the second user device, between the first user device of the first user and the second user device of the second user.

2. The method of claim 1,
wherein the distance score is based on a number of edges between the first user and one of the second user and the third user; and
wherein at least one property of the number of edges includes: a geographical distance between the first user and one of the second user and the third user, a number of interactions between the first user and one of the second user and the third user, or a rating for a previous encounter between the first user and one of the second user and the third user.

3. The method of claim 1, further comprising adjusting the pairing score threshold based on one or more of:
an amount of time elapsed since receiving the request from the first user;
an amount of stored data associated with the first user; or
a number of received requests.

4. The method of claim 1, wherein:
the request from the first user identifies the second user as a desired target for electronic communications; and
pairing the first user with the second user depends on the selection of the identified second user from a plurality of other users based on a plurality of pairing scores.

5. The method of claim 1, further comprising:
receiving feedback for the second user from the first user; and
updating the graph database based on the feedback.

6. The method of claim 5, wherein the received feedback comprises one or more of explicit feedback and implicit feedback.

7. The method of claim 1, further comprising:
calculating a second plurality of pairing scores between the third user and a plurality of other users, wherein each of a plurality of pairing scores is based on a collaborative filtering score between the third user and one of the plurality of other users.

8. The method of claim 7, wherein selecting the second user is further based on the second plurality of pairing scores.

9. A system for pairing user devices for electronic communications over an electronic network, the system comprising:
a storage device that stores instructions;
at least one hardware processor that executes the instructions to perform a method including:
receiving, by a hardware system processor, a request from a first user device of a first user, wherein the request includes request data indicating that the first user is requesting electronic communications of a first type with a second user via a second user device, wherein the first type is one of a voice, a text, and a video capability of one of the first user device and the second user;

generating, by the hardware system processor, a first pairing score pertaining to the first user device of the first user and the second user device of the second user, the first pairing score being based on a collaborative filtering score and a distance score between the first user and the second user, and a distance score between the first user and a third user;

based on the generated first pairing score and a pairing score threshold, selecting, by the hardware system processor, the second user for establishing the electronic communication of the first type with the first user; and initiating, using the hardware system processor, electronic communications by transmitting user data of the first user and the first user device, and user data of the second user and the second user device, between the first user device of the first user and the second user device of the second user.

10. The system of claim 9,
wherein each distance score is based on a number of edges between the first user and one of a plurality of other users and the collaborative filtering scores are based on data from a graph database; and
wherein at least one property of the number of edges is: the geographical distance between the first user and one of the second user and the third user, the number of interactions between the first user and one of the second user and the third user, or a rating for a previous encounter between the first user and one of the second user and the third user.

11. The system of claim 9, wherein the instructions are further configured to cause the at least one hardware processor to:
receive feedback for the second user from the first user; and update the graph database based on the feedback.

12. The system of claim 9, wherein the instructions are further configured to cause the at least one hardware processor to:
calculate a second plurality of pairing scores between the third user and the plurality of other users, wherein each of the plurality of pairing scores is based on a collaborative filtering score between the third user and one of the plurality of other users; and
select the second user further based on the second plurality of pairing scores.

13. A non-transitory computer-readable medium storing instructions for a method for establishing electronic communications over an electronic network, the instructions configured to cause at least one processor to perform the method, and the method comprising:
receiving, by a system processor, a request from a first user device of a first user, wherein the request includes request data indicating that the first user is requesting electronic communications of a first type with a second user via a second user device, wherein the first type is one of a voice, a text, and a video capability of one of the first user device and the second user device;

generating, by the system processor, a first pairing score pertaining to the first user device of the first user and the second user device of the second user, the first pairing score being based on a collaborative filtering score and a distance score between the first user and the second user, and a distance score between the first user and a third user;

based on the generated first pairing score and a pairing score threshold, selecting, by the system processor, the second user for establishing the electronic communication of the first type with the first user; and initiating, using the system processor, electronic communications by transmitting user data of the first user and the first user device, and user data of the second user and the second user device, between the first user device of the first user and the second user device of the second user.

14. The computer-readable medium of claim 13, wherein each distance score is based on a number of edges between the first user and one of a plurality of other users and the collaborative filtering scores are based on data from a graph database; and wherein at least one property of the number of edges is: a geographical distance between the first user and one of the plurality of other users, a number of interactions between the first user and one of the plurality of other users, or a rating for a previous encounter between the first user and one of the plurality of other users.

15. The computer-readable medium of claim 13, wherein the instructions are configured to cause the at least one processor to perform operations further comprising:

receiving feedback for the second user from the first user; and updating the graph database based on the feedback.

16. The computer-readable medium of claim 13, wherein the instructions are configured to cause the at least one processor to perform operations further comprising:

calculating a second plurality of pairing scores between the third user and the plurality of other users, wherein each of the plurality of pairing scores is based on a collaborative filtering score between the third user and one of the plurality of other users; and selecting the second user further based on the second plurality of pairing scores.

* * * * *